United States Patent [19]

Nobuta

[11] Patent Number: 4,706,127
[45] Date of Patent: Nov. 10, 1987

[54] IMAGE PROCESSING APPARATUS

[75] Inventor: Hiroshi Nobuta, Yokohama, Japan

[73] Assignee: Canon Kabushiki Kaisha, Tokyo, Japan

[21] Appl. No.: 749,633

[22] Filed: Jun. 28, 1985

[30] Foreign Application Priority Data

Jul. 4, 1984 [JP] Japan ................................ 59-138361

[51] Int. Cl.⁴ .......................... H04N 1/32; H04N 1/40
[52] U.S. Cl. ................................... 358/280; 358/256; 358/288; 358/296
[58] Field of Search ................ 358/288, 280, 256, 296

[56] References Cited

U.S. PATENT DOCUMENTS 4,417,282 11/1983 Yamamoto ........................... 358/296
4,439,790 3/1984 Yoshida .............................. 358/257

Primary Examiner—Howard W. Britton
Attorney, Agent, or Firm—Fitzpatrick, Cella, Harper & Scinto

[57] ABSTRACT

An image processing apparatus comprises: an image memory in which non-compressed image data is stored; a detector to detect the storage address of the image data stored in the image memory; a discriminating circuit to discriminate whether the image data can be recorded on a single standard-scale recording paper or not in accordance with a detection signal of the detector; a laser beam printer to print the image data; and a controller to control this printer such that the image data is divided and printed on two or more recording papers in response to the result of the discrimination of the discriminating circuit when the image data cannot be recorded on one recording paper. The detector detects the values of the higher significant m bits of a write-end address of the image data stored in the image memory. The controller performs the long-scale process in dependence on the amount of the image data stored in the memory and on the size of the recording paper.

30 Claims, 9 Drawing Figures

IMAGE PROCESSING APPARATUS

BACKGROUND OF THE INVENTION

1. Field of the Invention

The present invention relates to an output system of image data stored in an image memory.

2. Description of the Prior Art

In the image expression using an intermediate gradient coding system for expressing an intermediate gradient image of $2^n$ gradients by n bits, the quantity of the image data of one line in the main scanning direction is constant irrespective of an image pattern. For example, in the case where one pixel is expressed by four bits (16 gradients) assuming that the resolution in the main scanning direction is 8 PEL, the quantity of all data of one line of an original of the A4 size is $216 \times 8 \times 4 = 6912$ bits. When it is assumed that the length in the sub-scanning direction of the original is 297 mm and the resolution is 8 line/mm, the whole data quantity per one sheet of the A4-size original is $6912 \times 297 \times 8 \approx 16,422,912$ bits. Thus, at least about 24 bits are needed as a storage address to store such a great amount of data in a conventional memory or the like and to control these data.

It is now assumed that an image data of one page has been stored from addresses A to B in an image memory, in the case where the image data is recorded on the standard-scale recording paper of the A4 size, a discrimination is made to see if this image data of one page can be recorded on the single standard-scale recording paper or not by calculating $B - A$. If $B - A$ is larger than 16,422,912 bits, the image data cannot be recorded on the one standard-scale recording paper, so that the data in the image memory has to be again read out from the address $(A + 16,422,912)$ to record the image data on the second standard-scale recording paper. To execute the above-mentioned operation, the 24-bit operation has to be performed with respect to all data. However, the 24-bit CPU (Central Processing Unit) is expensive and the arrangement of this unit becomes very complicated. In the foregoing intermediate gradient coding system, one pixel is expressed by the data amount of four bits; therefore if the address is shifted by merely one bit when the head pixel information is read out from the image memory, the information of the next pixel and of the subsequent pixels is unreliable. Thus, it is difficult to simplify the address control of the image memory.

SUMMARY OF THE INVENTION

It is an object of the present invention to solve the above-mentioned drawbacks.

Another object of the invention is to improve an image processing system.

Still another object of the invention is to provide an image processing apparatus in which the address control of an image memory is simplified and a discrimination is made to see if the image data of one page can be recorded on a single standard-scale recording paper or not.

Still another object of the invention is to provide an image processing apparatus in which when the long-scale image data is printed, the long-scale process is not performed in dependence on the size of the recording paper.

Other objects and features of the present invention will become apparent from the following detailed description and the appended claims with reference to the accompanying drawings.

DETAILED DESCRIPTION OF THE PREFERRED EMBODIMENTS

Embodiments of the present invention will now be described hereinbelow with reference to the drawings.

An image processing apparatus of the invention will be explained with respect to an example of a high-speed facsimile apparatus for transmission and reception having a printer of the electrostatic recording system in which the standard-scale recording papers (corresponding to JIS A4 size and JIS B4 size) are used.

Figure 1:
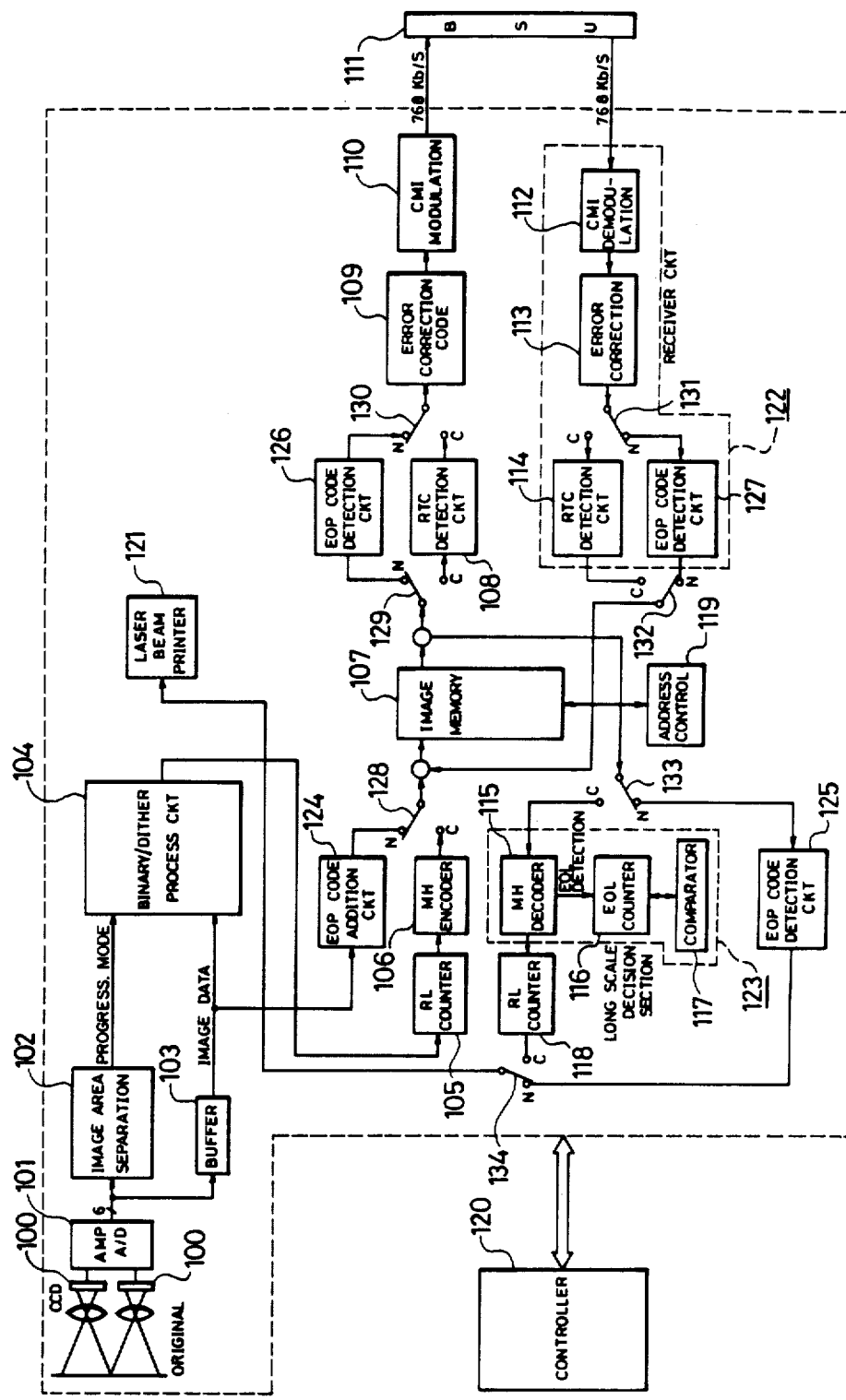
FIG. 1 is a block diagram of an image data processing section of an image processing apparatus of an embodiment of the present invention.

FIG. 1 is a block diagram of an image processing data section of the apparatus in one embodiment of the present invention. Image data on an original is optically read as pixel information and is converted to an electrical signal by a CCD 100. This electrical signal is amplified by an amplifier 101 and is A/D converted. This digitized image data is supplied to an image area separation processing circuit 102 and a buffer 103 and the process mode to perform either a binarization process or a dither process is determined. Then this process mode and the image data are inputted to a binary/dither processing circuit 104, so that the respective processes are performed. In this apparatus, either the compression mode in that the image data is compressed or the non-compression mode in that the image data is not compressed can be selected. In the compression mode, all switches 128 to 133 are connected to the side c, while they are connected to the side N in the non-compression mode. In the compression mode, for the image data from the binary/dither processing circuit 104, the length of the white or black continuous pixels in the main scanning direction is counted by an RL (Run Length) counter 105 for counting the number of continuous white or black pixels. The image data is MH-coded by an MH encoder 106 and thereafter it is stored in an image memory 107.

On one hand, in the non-compression mode, the image data from the buffer 103 is inputted to an EOP (End of Page) code addition circuit 124, so that the code indicative of the end of one page is added to the image data and then this data is stored in the image memory 107. At this time, the MH encoder 106 adds an EOL (End of Line) code (this code is expressed by the MH code of "000000000001") indicative of the end of the line to the end of each line and also adds an RTC (Return to control) code representative of the end of page (this RTC code is constituted by two continuous EOL codes) to the end of each page.

Upon transmission, in the compression mode, the page data stored in the memory is sent to a circuit termination apparatus (hereinafter, referred to as a BSU (Broadband Service Unit)) 111 provided at the front stage of a terminal through an RTC code detection circuit 108, an eror correction coding circuit 109 to detect and correct errors of the coded data, and a CMI (Code Mark Inversion) modulator 110. In the non-compression mode, the page data is sent to the BSU 111 through an EOP (End of Page) code detection circuit 126, the error correction coding circuit 109, and the CMI modulator 110.

On the contrary, upon reception, in the compression mode, the image data from the BSU 111 is stored in the image memory 107 through a CMI demodulator 112, an error correction decoding circuit 113 and an RTC detection circuit 114. In the non-compression mode, the image data is stored in the image memory 107 through the CMI demodulator 112, the error correction decoding circuit 113 and the EOP code detection circuit 127.

In the compression mode, the stored image data is again read out from the image memory 107 and is decoded as an RL signal indicative of an RL code by an MH decoder 115. The decoded signal is converted into a pixel signal by an RL counter 118 and is outputted to a printer 121. In the non-compression mode, the image data is outputted to the printer 121 through an EOP code detection circuit 125.

The apparatus of the invention will be explained with respect to the digitization coding system to express such intermediate gradients as shown in Table 1.

TABLE 1

| Number of gradients per one pixel | 16 gradients (4 bits) |
|---|---|
| Number of pixels in the main scanning direction | 1728 pixels |
| Density of pixels in the sub-scanning direction | 8 line/mm |

Figure 2:
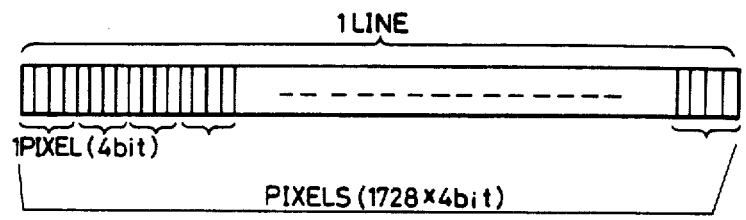
FIG. 2 is an arrangement diagram of the image data of one line in the main scanning direction.

According to this coding system, the image data of one line in the main scanning direction is constituted such that one pixel consists of a data of four bits and the data as many as 1728 pixels is arranged in a line as shown in FIG. 2.

Figure 3:
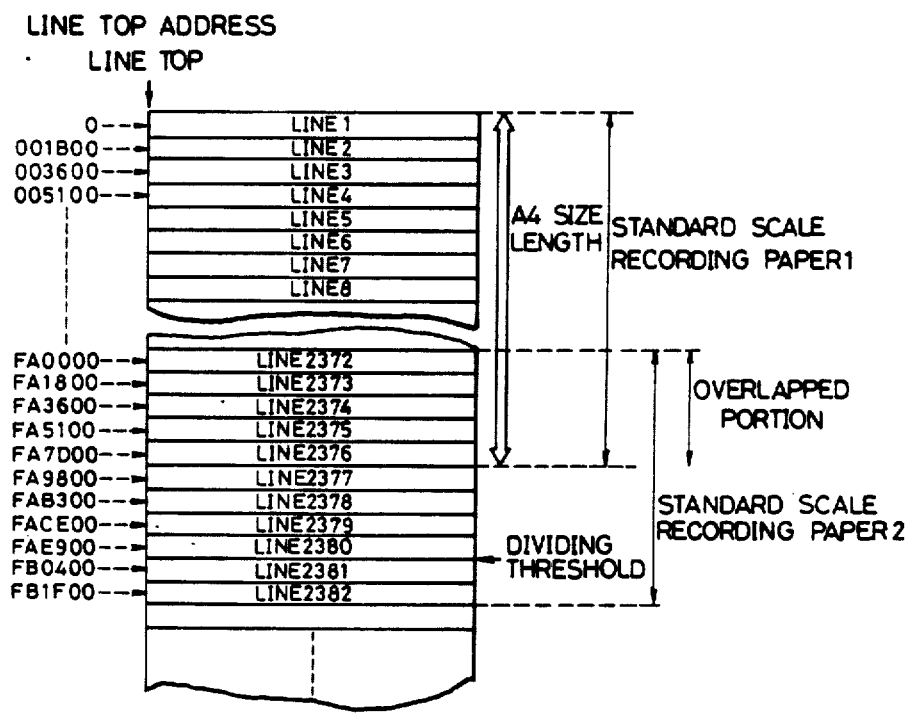
FIG. 3 is a diagram showing the storage state in an image memory.

FIG. 3 shows the case where the line data shown in FIG. 2 as much as 2382 lines is stored from the address 0 in the image memory. Each numeral in the left end portion in the diagram indicates the hexadecimal number representing the address in the memory corresponding to the head bit of each line. Assuming that the length in the sub-scanning direction of the standard-scale recording paper is equal to the length of the A4-size recording paper, the number of lines is 2376 (297 mm×8 line/mm) lines. Therefore, the image data after the 2377th line to the 2382nd line in the memory cannot be recorded on a single standard-scale recording paper, so that the data from the 2377th line to the 2382nd line has to be recorded on the second standard-scale recording paper. In this way, all image data in the image memory can be accurately divided and reproduced on two sheets of standard-scale recording papers. In this case, the data to be recorded in the head portion of the second recording paper, in other words, the address of the head bit of the 2377th line is $FA9800_{(16)}$. However, in the case where the image data is not stored from the address 0, for example, if it is recorded from the address Y, the 24-bit operation such as (Y+FA9800) has to be performed to calculate the address of the head bit of the 2377th line.

In the present system, to avoid such a complicated operation, the line to be recorded in the head portion of the second recording paper is determined in the following manner such that the whole system can be constituted by a simple 8-bit operation.

The number of bits of one line is 1728×4. If this number is converted to a hexadecimal number, it will be $1B00_{(16)}$. Therefore, the address of the head bit of each line becomes a multiple of $1B00_{(16)}$. In FIG. 3, the 2372nd line of which the address $FA000_{(16)}$ is the address of the head bit is the line of which all of the lower significant 16 bits (lower four digits in case of the hexadecimal number) of the address in the head portion of the line are 0, and at the same time the 2372nd line is closest to the 2376th line as the last line of the first recording paper (1). Therefore, if the data from the 2372nd line to the 2382nd line is recorded on the second recording paper (2), only the address of the upper significant eight bits (FA of the upper two digits in case of the hexadecimal number) may be operated. Also, only the address of the head bit of each line may be controlled. It is now assumed that the head portion of the image data has been stored from the address Y in the image memory. At this time, if all lower significant 16 bits in the address Y are 0, the operation such as (upper significant eight bits of the address Y+FA) may be performed to calculate the address of the head bit of the line (the 2372nd line from the head) to be recorded in the beginning of the second standard-scale recording paper, so that the operation of only the upper significant eight bits of the address may be carried out.

On one hand, in FIG. 3, in case of making a discrimination to see if the image data of one page can be recorded and outputted on one recording paper, when it is assumed that the address of the last bit of the image data stored in the image memory is the address Z, it is necessary to execute the operation to check whether the address Z is over the address FA9800 or less. This operation is also disadvantageous because it is the 24-bit operation.

Therefore, to convert this discriminating operation to the 8-bit operation as well, the address FB0000 which is closest to the address FA9800 and of which the values of the upper significant eight bits vary is set to the discrimination reference address. Therefore, in this system, the setting of the discrimination reference address is performed with respect to only the upper significant eight bits of the address.

Practically speaking, a discrimination to see if the image data stored can be recorded and outputted on one recording paper or not is executed according to whether or not the upper significant eight bits of the address of the last bit of the image data stored are greater than FB. In FIG. 3, since the image data is constituted by 2382 lines, the address of the last bit of the image data stored in the memory becomes FB32FF (FB1F00+1B00−1) (corresponding to the 2382nd line). Therefore, when considering only the upper significant eight bits, the foregoing address becomes "FB" and is not below "FA", so that it is decided that the image data stored cannot be recorded on one standard-scale recording paper. However, in the case of an image wherein the last line lies within a range of the 2377th to 2380th lines, there is a possibility that the upper significant eight bits of the address of the last bit become "FA", so that it is determined that the image data can be recorded on one standard-scale recording paper. However, since only the data up to the 2376th line is recorded, the data for up to four lines is lacking. This lack of data does not cause a substantial problem because it corresponds to the lack of at most 0.5 mm for the resolution of 8 line/mm.

On the other hand, it is assumed that the image data is stored from the address Y in the memory and the address of the last bit of the image data is X. In this case, to perform the above-mentioned discrimination, $X-Y$ is calculated and a check is made to see if the upper significant eight bits are greater than FB on the basis of the result of the calculation, thereby enabling a similar discrimination to be executed. By presetting the address Y such that all of the lower significant 16 bits are 0, the operation of $X-Y$ can be carried out as the 8-bit operation by use of only the upper significant eight bits of the address X.

Figure 4:
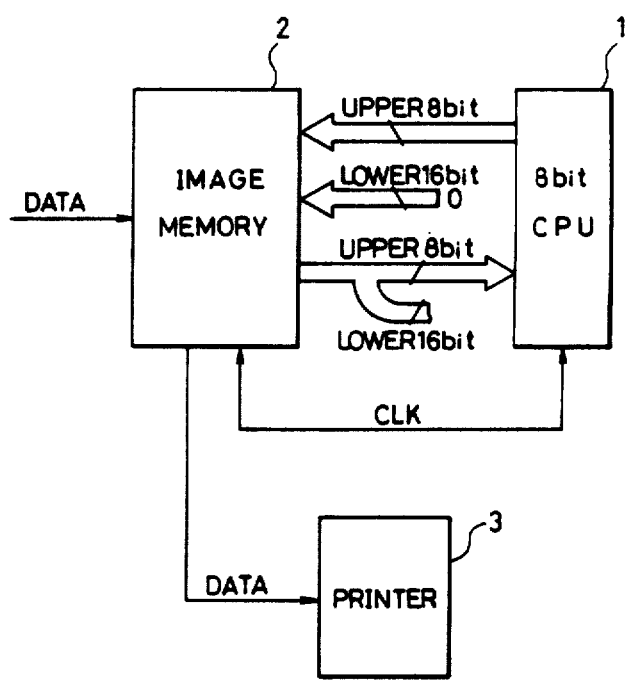
FIG. 4 is an arrangement diagram of the image memory and CPU.

FIG. 4 is a block diagram showing the relation between a CPU to execute the foregoing discrimination and the image memory. A reference numeral 1 denotes an 8-bit CPU, 2 is a 32-Mbit image memory, and 3 is a well-known printer such as a laser beam printer or the like to record an image on a cut sheet. The data of the upper significant eight bits among 24 bits of the address is sent from the CPU 1 to the image memory 2 in order to set a write-start address or a read-start address of the data to be recorded. In this case, the data of all 0's is fixed for the lower significant 16 bits. On the contrary, in the case of reading the address in the image memory 2, the CPU 1 receives only the data of the upper significant eight bits among the 24 bits of the address and the lower significant 16 bits are ignored. Thus, the CPU 1 controls only the upper significant eight bits of the address. Accordingly, the head bit of the image data of one page is accurately stored in the address of which the lower significant 16 bits of the address are 0000.

To record by the printer 3, a read clock pulse is sent from the CPU 1 to the image memory 2 and the image data is sent to the printer 3.

Figure 5:
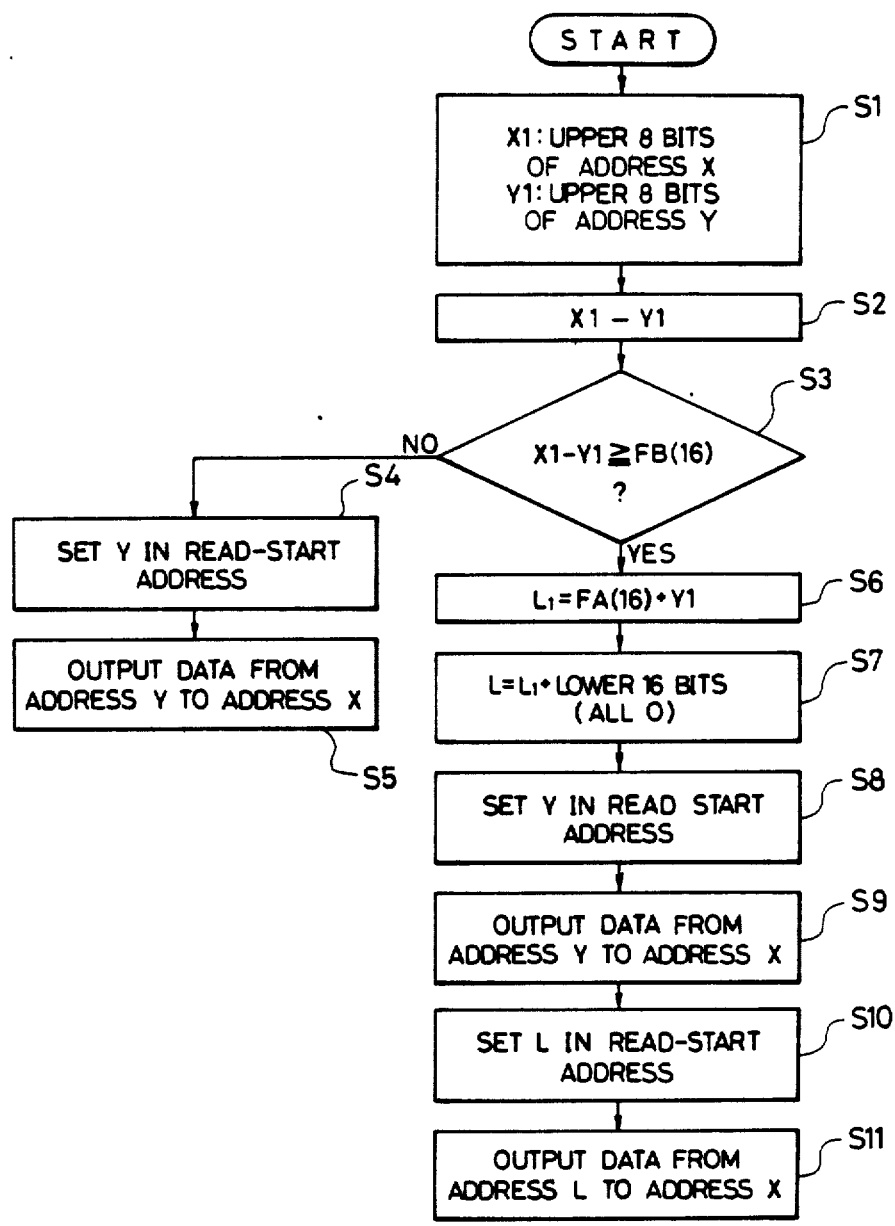
FIG. 5 is a flowchart for the address control of the CPU for the long-scale process.

The operation for the address control by the CPU 1 will then be described with reference to a flowchart of FIG. 5. First, the write-start address in the memory of the image data is set to Y and the last write-address is set to X, and then the respective upper significant eight bits are set to $Y_1$ and $X_1$ (STEP S1). X and Y are the 24-bit address data and the lower significant 16 bits of the data Y are all 0 when the write-start address is set. Since the CPU 1 is the 8-bit processor, it receives only the upper significant eight bits of the data X. To detect the amount of the image data, $X_1-Y_1$ is calculated (STEP S2). A check is made to see if the value of the $X_1-Y_1$ is over $FB_{(16)}$ or less (STEP S3), in which $FB_{(16)}$ is the division threshold level indicating whether the image data can be recorded on a single standard-scale recording paper (A4 size in this example) or not. If this value is less than $FB_{(16)}$, the image data can be recorded on one standard-scale recording paper; therefore, Y is set into the read-start (record-start) address in the memory (STEP S4). Then, the read clock is outputted to the memory, thereby allowing the data from the address Y to the address X to be recorded and outputted (STEP S5) from the memory. If the value of $X_1-Y_1$ is over $FB_{(16)}$, the image data cannot be recorded on one standard-scale recording paper, so that the long-scale process, namely, the division recording process is performed. The head address of the long-scale processing line, namely, the head write-address L onto the second recording paper is calculated. Assuming that the upper significant eight bits of the address L are $L_1$, the sum $(L_1=FA_{(16)}+Y_1)$ of the $FA_{(16)}$ of which all of the lower significant 16 bits are 0 and the $Y_1$ is first calculated (STEP S6). Then, the address L is obtained by adding 0 of the lower significant 16 bits to the $L_1$ (STEP S7). Y is set into the read-start address (STEP S8). The read clock is outputted to the memory, thereby allowing the data from the address Y to the address X to be recorded and outputted to the printer (STEP S9). In this case, since the image data up to the address X cannot be recorded on one recording paper, the data in the unrecordable portion is ignored. Then, L is again set into the read-start address (STEP S10) and the data from the address L to the address X is recorded and outputted to the printer (STEP S11). Therefore, in the case where the image data is divided and recorded on two standard-scale recording papers, the image data in the tail portion of the first recording paper can be also automatically arranged in the head portion of the second recording paper.

In addition, since the CPU controls only the upper significant eight bits of the address, the image data in the address X which is recorded on the second recording paper actually becomes the data stored in the address where the upper significant eight bits become $X_1$. Thus, there is a case where the image data is not recorded even if recording of the image data up to address X is attempted. To solve this problem, lack of data can be prevented by instructing the memory such that the image data is recorded until the address where the upper significant eight bits become $X_1+1$.

Figure 6:
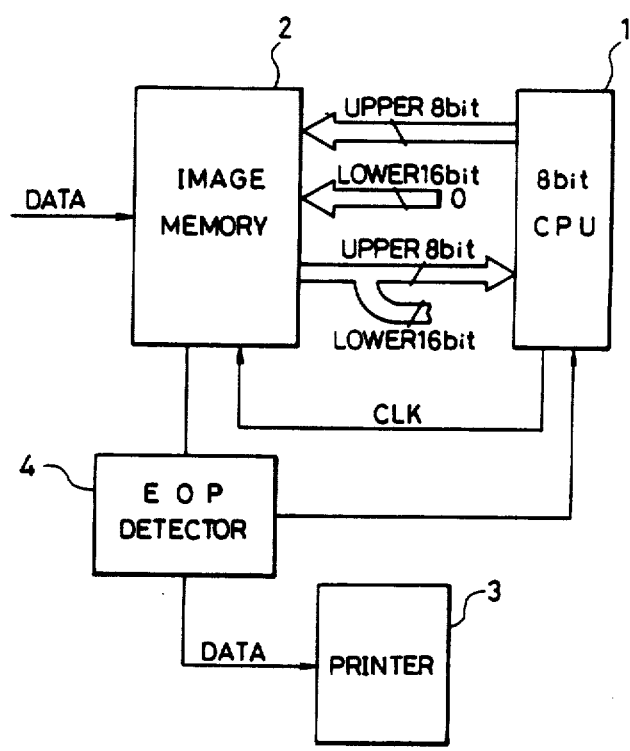
FIG. 6 is a diagram showing another embodiment of an arrangement of the image memory and CPU.

On the other hand, when the image data of one page is stored in the memory, if the EOP code indicative of the end of one page is added to the image data and then the data is stored in memory, the readout from the memory can be stopped by detecting this EOP code when the image data is read out from the memory and recorded. FIG. 6 shows a block diagram for this purpose. A reference numeral 4 denotes an EOP (End of Page) code detector. When the image data is read out from the memory, the detector 4 sends a detection signal to the CPU 1 when it detects the EOP code added to the end of one page. In response to this detection signal, the CPU 1 stops outputting the read clock, thereby stopping the printing. The remaining arrangement is substantially the same as that in FIG. 3; therefore, its description is omitted.

Figure 7:
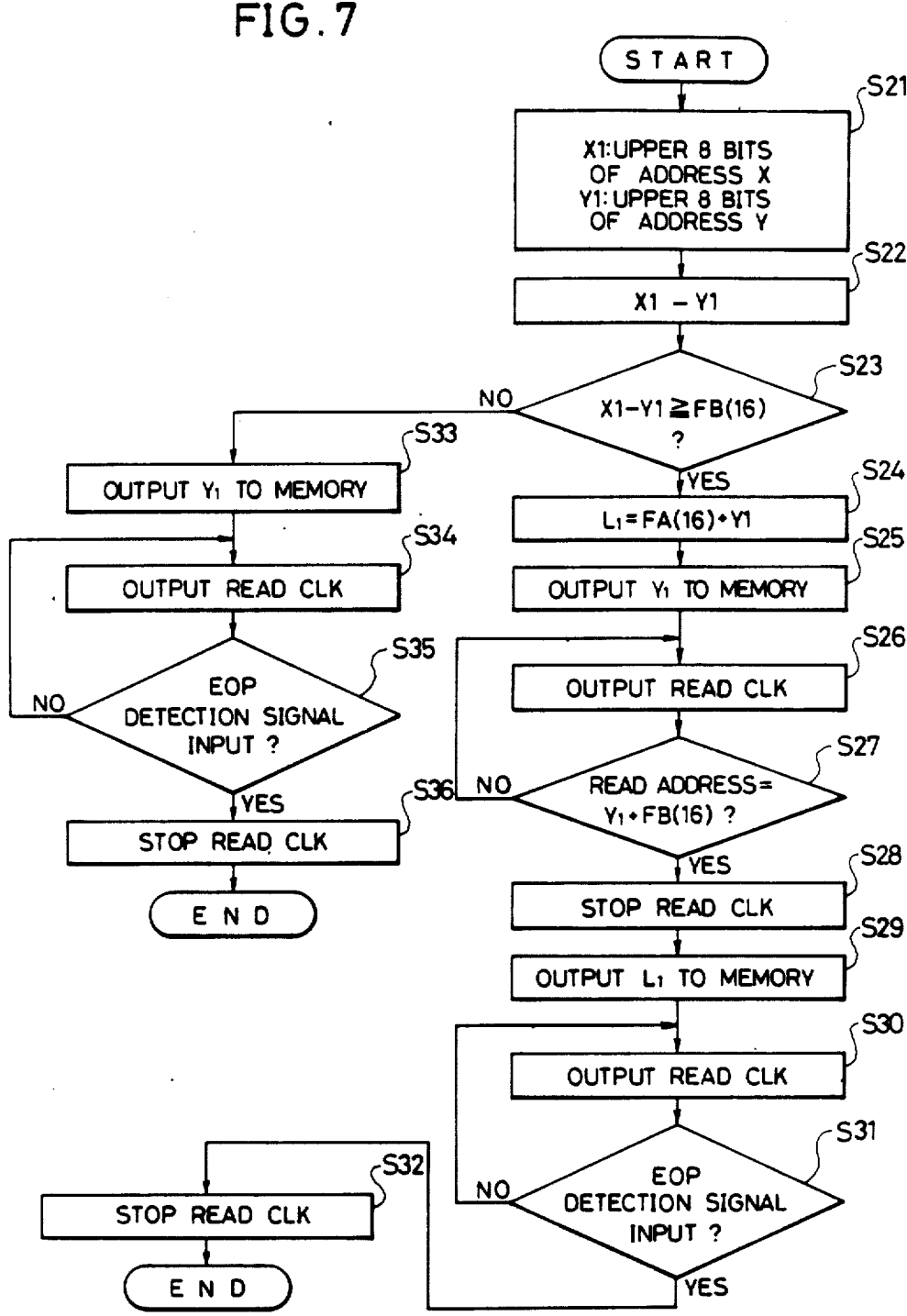
FIG. 7 is a flowchart showing another embodiment for the address control of the CPU for the long-scale process.

FIG. 7 shows a control flowchart for the long-scale process of the CPU in FIG. 6.

First, the write-start address of the memory of the image data is set to Y and the last-write-address is set to X, and then the respective upper significant eight bits are set to $Y_1$ and $X_1$ (STEP S21). To detect the amount of the image data, $X_1-Y_1$ is calculated (STEP S22). A check is made to see if the value of $X_1-Y_1$ is over $FB_{(16)}$ or less (STEP S23), in which $FB_{(16)}$ denotes the division threshold level indicating whether or not the image data can be recorded on one standard-scale recording paper (A4 size in this example). If this value is less than $FB_{(16)}$, the data can be recorded on one standard-scale recording paper, so that $Y_1$ is outputted to the memory as the upper significant eight bits of the read-start (record-start) address in the memory (STEP S33). Then, the read clock is outputted to the memory (STEP S34). The image data is read out from the memory synchronously with the read clock and is printed. A check is then made to see if the EOP (End of Page) detection signal was inputted or not (STEP S35). If it was inputted, the outputting of the read clock is stopped (STEP S36) and the readout of the image data is stopped and the printing is finished. If $X_{1l-Y_1}$ is greater than $FB_{(16)}$, the image data cannot be recorded on one standard-scale recording paper, so that the long-scale process, namely, the division recording process is executed. Then, $L_1$ is calculated as the head address of the long-scale processing line, namely, as the upper significant eight bits of the head write-address on the second recording paper. In other words, the sum $(L_1 = FA_{(16)} + Y_1)$ of the $FA_{(16)}$ of which all of the lower significant 16 bits become 0 and the $Y_1$ is first calculated (STEP S24). As the upper significant eight bits of the read-start address, $Y_1$ is outputted to the memory (STEP S25) and the read clock is outputted (STEP S26). Then, the image data is read out and a check is made to see if the upper significant eight bits of the address become $Y_1 + FB_{(16)}$ or not (STEP S27). If it is $Y_1 + FB_{(16)}$, the image data cannot be recorded on one recording paper, so that the outputting of the read clock is stopped (STEP S28). To record the data on the second recording paper, the $L_1$ is again outputted to the memory as the upper significant eight bits of the read-start address (STEP S29), and the read clock is outputted (STEP S30), thereby reading the image data and restarting the printing. A check is made to see if the EOP detection signal was inputted or not (STEP S31). If it was inputted, the outputting of the read clock is stopped and the printing is finished (STEP S32).

Although the upper significant eight bits of the address of the head bit of each line of the image data have been controlled in this embodiment, the invention is not limited to the head bit but the address of any bit number may be controlled.

On the other hand, although the foregoing embodiments have been described with regard to the facsimile apparatus, the present invention can be also applied to an apparatus which reads out and prints the image data stored in an electronic file or the like. That is, from a control data group of a disk, by detecting from which sector to which sector the image data of one page stored in a storage medium such as an optical disk or the like in an electronic file has been stored, it is possible to discriminate whether the image data can be recorded on a recording paper of a predetermined size or not in accordance with the number of sectors to be used.

Further, the image data can be also recorded on a recording paper of such a size that the image data can be sufficiently recorded on a single recording paper without performing the long-scale process. Practically speaking, the size of the recording paper in a cassette set in the printer is detected and is compared with the size data of the data transmitted, thereby discriminating to see if the width is large enough such that the data of one line can be recorded or not. If the recording can be performed, a write-end address of the image data stored in the memory is detected and the amount of the image data (namely, the number of scanning lines) is checked. Then, a discrimination is made to see if the length of the recording paper is large enough such that all lines can be recorded or not. These discriminations are performed with respect to all of the recording papers set in the printer. Unless the papers of the proper size are set in the cassette, the foregoing long-scale process is executed.

Figure 8:
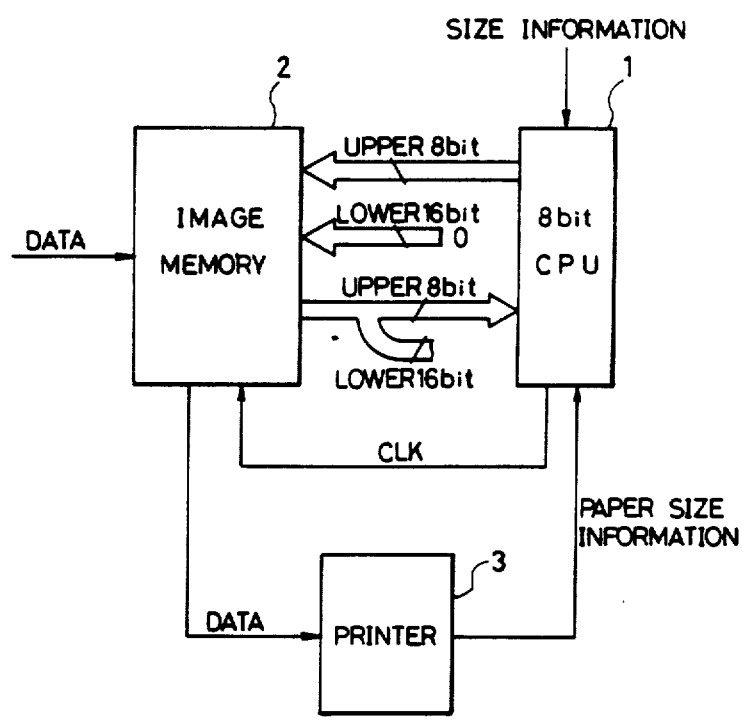
FIG. 8 is a diagram showing still another embodiment of an arrangement of the image memory and CPU.
Figure 9:
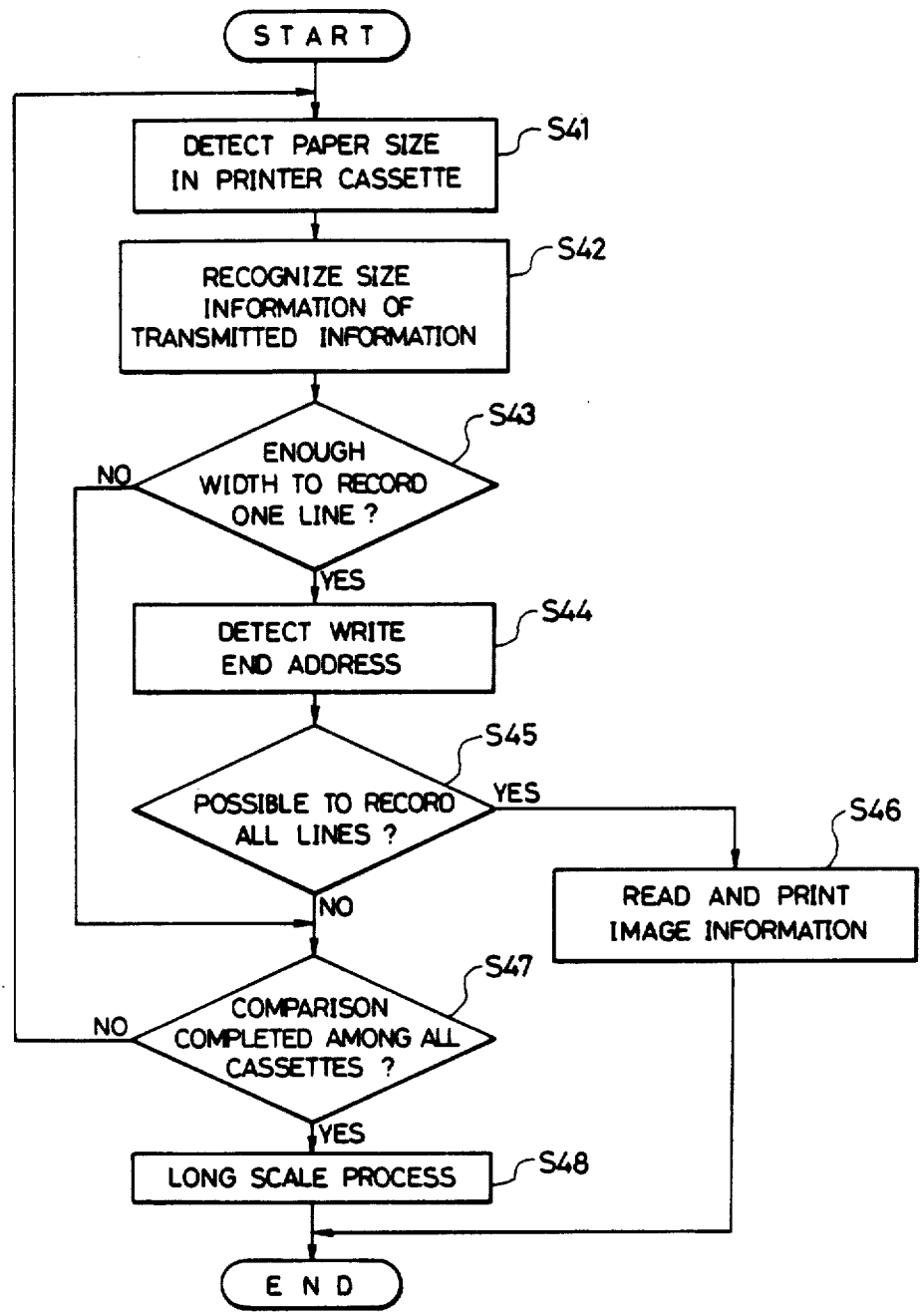
FIG. 9 is a flowchart showing still another embodiment for the address control of the CPU for the long-scale process.

FIG. 8 shows a block diagram to perform the above-mentioned operation. FIG. 9 shows a control flowchart for this operation. By executing the above-mentioned processes, for example, even if the quantity of data transmitted is slightly larger than the data capacity in the A4-size recording paper, it can be accurately recorded on the B4-size recording paper.

The present invention is not limited to the foregoing embodiments but many modifications and variations are possible within the spirit and scope of the appended claims of the invention.

Further, although the foregoing embodiments have been described with respect to the image memory on the reception side, the invention can be also similarly executed even with regard to the memory on the transmission side. Namely, in place of transmitting the data to the printer, it may be sent to a transmitting circuit.

What I claim is:

1. An image processing apparatus comprising:
 a memory in which image data is stored;
 detecting means for detecting a quantity of stored image data in accordance with a storage address of the image data stored in said memory;
 recording means for recording the image data on a recording medium, said recording medium including a plurality of recording sheets having a predetermined size; and
 judging means, responsive to said detecting means, for determining whether or not the stored image data can be recorded on one of said recording sheets and, if not, for determining how the stored image data should be divisionally recorded on a plurality of said recording sheets.

2. An image processing apparatus according to claim 1, wherein said detecting means detects the values of the m upper significant bits of the address of a predetermined bit number from the head of each scanning line of the image data.

3. An image processing apparatus according to claim 1, wherein said memory is a disk-like recording medium and said detecting means detects a sector address in which the image data was stored.

4. An image processing apparatus according to claim 1, wherein the lower l significant bits of a write-start address of the image data are always set to a predetermined value.

5. An image processing apparatus according to claim 1, wherein the image data includes digital data representing an intermediate gradient image.

6. An image processing apparatus according to claim 1, wherein said recording medium includes a cut sheet.

7. An image processing apparatus according to claim 1, wherein the image data stored in said memory is of a non-compression type.

8. An image processing apparatus according to claim 1, further comprising control means for controlling said recording means such that said image data is divisionally recorded on said plurality of recording sheets.

9. An image processing apparatus according to claim 8, wherein said control means controls a read-out address for the image data to be read out from said memory.

10. An image processing apparatus according to claim 1, wherein said detecting means detects a head address and a write-end address of the image data stored in said memory.

11. An image processing apparatus according to claim 10, wherein said detecting means detects the values of the m upper significant bits of said address.

12. An image processing apparatus according to claim 11, wherein said judging means includes means for comparing the quantity of image data detected by said detecting means with a predetermined value.

13. An image processing apparatus according to claim 12, wherein said judging means determines whether or not the image data can be recorded on one sheet of said recording medium of predetermined size by determining whether or not the amount of the detected image data is larger than said predetermined value.

14. An image processing apparatus, comprising:
image-forming means for forming an image on a recording medium by recording input image data on said recording medium, said recording medium comprising a plurality of recording sheets of a predetermined size, and said image data corresponding to one page;
processing means for determining whether or not said image can be formed on one recording sheet of said recording medium and, if not, for controlling said image-forming means to divisionally record said image on said recording medium by recording said image data on a plurality of sheets of said recording medium of said predetermined size;
detecting means for detecting the size of a recording sheet of said recording medium stored in said image-forming means; and
inhibiting means for inhibiting an operation of said processing means when said detecting means detects that the size of said recording sheet of said recording medium is larger than said predetermined size.

15. An image processing apparatus according to claim 14, wherein said recording medium includes a cut sheet.

16. An image processing apparatus according to claim 14, wherein said processing means includes means for detecting a quantity of the image data, and comparing means for comparing the detected quantity with a value corresponding to said predetermined size.

17. An image processing apparatus according to claim 16, further comprising a memory for storing the image data, wherein said detecting means detects the quantity of image data in response to an address of the image data stored in said memory.

18. An image processing apparatus, comprising:
a memory for storing image data;
detecting means for detecting a quantity of the stored image data in response to a storage address of the image data, the detected image data corresponding to one page of an image stored in said memory;
recording means for recording the image data stored in said memory, on a recording medium; and
control means for controlling said recording means such that the image data corresponding to said one page of the image is divisionally recorded in response to the quantity of image data detected by said detecting means.

19. An image processing apparatus according to claim 18, wherein the image data stored in said memory is of a non-compression type.

20. An image processing apparatus according to claim 18, wherein said detecting means detects the quantity of stored image data in response to the values of the upper m significant bits of the storage address of the image data.

21. An image processing apparatus according to claim 18, wherein said control means controls a readout address of said memory.

22. An image processing apparatus according to claim 18, wherein said recording medium includes a plurality of recording sheets, and wherein said control means controls said recording means to divisionally record the image data on a plurality of sheets of said recording medium.

23. An image processing apparatus according to claim 22, wherein said recording medium includes a cut sheet.

24. An image processing apparatus according to claim 18, further comprising receiving means for receiving transmitted image data, wherein the received image data is stored in said memory.

25. An image processing apparatus according to claim 24, wherein the transmitted image data is a facsimile signal.

26. An image processing apparatus according to claim 18, wherein the lower 1 significant bits of a head address of the stored image data, for one page, are always a predetermined value.

27. An image processing apparatus according to claim 26, wherein the predetermined value is 0.

28. An image processing apparatus according to claim 18, wherein said control means includes comparing means for comparing the quantity of image data detected by said detecting means with a predetermined value, and wherein the detected image data is divisionally recorded when the quantity of detected image data is larger than the predetermined value.

29. An image processing apparatus according to claim 28, wherein the predetermined value is associated with a size of said recording medium.

30. An image processing apparatus according to claim 28, wherein a portion of the image data divisionally recorded is repeated.

* * * * *

UNITED STATES PATENT AND TRADEMARK OFFICE
CERTIFICATE OF CORRECTION

PATENT NO. : 4,706,127

DATED : November 10, 1987

INVENTOR(S) : HIROSHI NOBUTA

It is certified that error appears in the above-identified patent and that said Letters Patent is hereby corrected as shown below:

AT [57] IN THE ABSTRACT:

Line 14, "higher" should read --upper--.

COLUMN 1

Line 27, "memory," should read --memory.--.
Line 28, "in" should read --In--.

COLUMN 3

Line 13, "eror" should read --error--.

COLUMN 6

Line 40, "become" should read --becomes--.

COLUMN 7

Line 12, "$X_1{'}{-Y_1}$" should read --$X_1-Y_1$--.

Signed and Sealed this

Twenty-first Day of June, 1988

Attest:

DONALD J. QUIGG

*Attesting Officer*          *Commissioner of Patents and Trademarks*